United States Patent [19]

Weisinger

[11] 3,862,489

[45] Jan. 28, 1975

[54] METHOD OF MANUFACTURING BORON-ALUMINUM COMPOSITE TUBES WITH INTEGRAL END FITTINGS

[75] Inventor: Martin Donald Weisinger, San Diego, Calif.

[73] Assignee: General Dynamics Corporation, San Diego, Calif.

[22] Filed: Nov. 29, 1973

[21] Appl. No.: 420,028

Related U.S. Application Data

[63] Continuation-in-part of Ser. No. 240,711, April 3, 1972, Pat. No. 3,788,926.

[52] U.S. Cl.............. 29/476.5, 29/477, 29/497.5, 29/423, 156/155, 156/294
[51] Int. Cl... B21c 37/083, B32b 1/08, B32b 31/20
[58] Field of Search .... 29/157.5, 157.6, 423, 470.5, 29/473.5, 476.5, 477, 497.5; 156/155, 285, 286, 294

[56] References Cited
UNITED STATES PATENTS

| 2,281,213 | 4/1942 | Thaden | 29/476.5 UX |
|---|---|---|---|
| 2,967,139 | 1/1961 | Bartoszak | 29/473.5 |
| 2,977,269 | 3/1961 | Nerwick | 156/285 UX |
| 3,258,377 | 6/1966 | Scott | 156/294 X |
| 3,377,695 | 4/1968 | Gripshover | 29/497.5 X |
| 3,481,024 | 12/1969 | Bunn | 29/473.5 |
| 3,579,800 | 5/1971 | Packard | 29/423 |
| 3,703,032 | 11/1972 | Batista | 29/497.5 X |
| 3,788,926 | 1/1974 | Weisinger | 156/286 |

Primary Examiner—Al Lawrence Smith
Assistant Examiner—K. J. Ramsey
Attorney, Agent, or Firm—John R. Duncan

[57] ABSTRACT

A method of simultaneously forming Boron-Aluminum composite tubes and securely bonding them to aluminum or titanium end-fittings. Sheets comprising unidirectional boron fibers bonded to aluminum foil or imbedded in an aluminum matrix are wound into a tubular shape with the fibers substantially parallel to the tube axis or at an angle of up to about 45°. Sheets with one or both ends tapered are rolled to form a number of helical steps, in telescoping fashion, at one end. An end fitting have a corresponding taper is placed in contact with each tapered tube end. This assembly is placed between inner and outer shaping tubes and the space between the shaping tubes is sealed and the space evacuated. The wall strength of the inner shaping tube is lower than that of the outer tube. The assembly is placed in an autoclave, heated to the appropriate diffusion bonding temperature and placed under sufficient isostatic pressure to deform the inner shaping tube outwardly to press the composite tube and fitting against the outer shaping tube. Upon removal of the shaping tubes, a well-consolidated composite tube diffusion bonded to the end fitting results.

7 Claims, 7 Drawing Figures

METHOD OF MANUFACTURING BORON-ALUMINUM COMPOSITE TUBES WITH INTEGRAL END FITTINGS

CROSS-REFERENCE TO RELATED APPLICATION

This application is a continuation-in-part of co-pending U.S. patent application Ser. No. 240,711, filed Apr. 3, 1972, now U.S. Pat. No. 3,788,926.

BACKGROUND OF THE INVENTION

This invention relates in general to high-strength composite material structures and, more specifically, to the manufacture of boron-aluminum composite tubes with solid titanium or aluminum end fittings.

Recently, structures formed from high-strength fibers in a supporting matrix have come into widespread use. Fiberglass reinforced synthetic resin structures are widely used. With the development of high-strength graphite and boron fibers has come the development of structures using them in both metallic and plastic matrices.

Composites comprising unidirectionally arrayed boron fibers in an aluminum matrix have a number of advantages in aerospace applications. These composites have outstanding mechanical properties, including high stiffness and high transverse strength, making them an excellent choice for tubular truss elements loaded unidirectionally. These composites are also very much lighter in weight than structures of equal strength formed from other materials.

Unfortunately, these composites are very difficult to form. The low elongation of the fibers prevents any stretch in the material in the fiber direction. Conventional sheet metal forming methods such as stretch wrapping are not suitable for composites, since a pre-stretch using this method would either rupture the fibers or fail the matrix. Attempts to form composite shapes by compression have been largely unsuccessful due to wrinkling of the sheet preforms and breaking of fibers.

In order to incorporate composite tubes into a large structure or assembly, means must be provided for connecting the tubes to other structural components such as aluminum or titanium end fittings. Rivets and bolts are undesirable because of the low shear strength of the material parallel to the fibers and the stress risers caused by local holes and fasteners. These materials often cannot be welded, because of fiber degradation at welding temperatures. Brazing has been found to be useful, but produces relatively low strength joints.

Thus, there is a continuing need for improved methods of forming boron-aluminum tubes and fastening them to related components such as solid titanium or aluminum end fittings.

SUMMARY OF THE INVENTION

It is, therefore, an object of this invention to provide an improved method for securing boron-aluminum tubes to associates fittings.

Another object of this invention is to provide a method of simultaneously forming a boron-aluminum tube and bonding it to solid end fittings.

A further object of this invention is to provide a method of producing bonds of increased strength between boron-aluminum tubes and titanium or aluminum end fittings.

The above objects, and others, are accomplished in accordance with this invention by a method which begins with the step of winding sheets of boron-aluminum composite material into a coil with the boron fibers lying substantially parallel to the coil axis or at angles up to about 45° to the tube axis. The sheets are tapered or stepped at one end so that the end of the coil is tapered in a stepped, telescope-like, manner. An end fitting having a correspondingly stepped or tapered sleeve is brought into contact with the stepped coil end. This assembly is placed between two shaping tubes and the inter-tube space is evacuated and sealed or a continuous vacuum is maintained. The outer shaping tube has a higher wall strength than the inner tube. The assembly is placed in an autoclave in which the temperature is raised to the appropriate diffusion bonding temperature and the pressure is raised to isostatically press the inner shaping tube outwardly to consolidate the boron-aluminum coil and diffusion bond it to the fitting. The assembly is then removed from the autoclave and the shaping tubes are removed. The composite tube with the titanium or aluminum end fitting then may be used in any appropriate structural application. The end fitting may be secured to other structures in any suitable manner, such as welding.

The strength of the boron-aluminum composite can be greatly increased by including a preferred post-forming heat treatment. For optimum results, the composite tube is solution heat treated to about 975°F, then is aged at about 350°F for about 1 hour. The heat treatment does not cause any distortion, cracking or delamination in the composite or at the end fitting. Compressive strength of the tube is greatly increased, due to the strengthened aluminum matrix which acts as a stabilizing force on the boron filaments.

In order to assure that the inner forming tube expands outwardly to press the composite material against the inner wall of the outer forming tube, it is strongly preferred that the wall strength of the outer tube be at least twice the wall strength of the inner tube. This is most easily and conveniently accomplished by using the inner and outer tubes of the same composition, with the outer tube having at least twice the wall thickness of the inner tubes. Of course, if desired the forming tubes may be made of materials having different strengths, with the inner tube made weaker. In that case, both tubes could have the same thickness. Any suitable combination of tube composition and thickness may be selected, so long as the actual wall strength of the outer tube is at least about twice that of the inner tube.

It has been found to be highly undesirable to use a weaker outer tube, since if it is deformed inwardly under isostatic pressure wrinkles, folds and fractured fibers are produced in the composite tube and the end fitting is deformed. Use of equal tube wall strengths permits full consolidation of the composition material but allows the overall tube shape to deform out-of-round as a result of the differences in total inner and outer forces, this force difference being equal to the pressure times the difference in exposed surfaces of the inner and outer tubes. Surprisingly, where the preferred stronger outer tube is used, the composite tube is found to have a higher degree of concentricity and to be more uniformly round than either of the original forming tubes.

Any suitable tubing may be used for the inner and outer forming tubes. Typical materials include iron, mild steel, stainless steel, copper, and nickel. Mild steel is preferred since it is available in a variety of diameters in a smooth surfaced seamless tubing, is inexpensive, and may be quickly and conveniently removed with nitric acid which has no serious deleterious effect on the composite material or attached fittings. The inner surface of the outer tube and the outer surface of the inner tube between which the composite material is pressed, should be smooth and reasonably blemish free. Also, the inner surface of the inner tube should be substantially free from longitudinal scratches or striations, since these may cause cracks as the inner tube expands during the forming operation. Where both inner and outer forming tubes have the same composition, it is preferred that the outer tube have a wall thickness from about 1½ to 3 times the thickness of the on the inner tube. Where both tubes are formed from mild steel, best results are obtained where the inner tube has a wall thickness of from about 0.062 to 0.125 inch and the outer tube has a thickness of from about 0.100 to 0.187 inch. in proportion. These relative dimensions may be sealed up or down to produce composite tubes of other diameters.

The space between the ends of the inner and outer forming tubes may be sealed by any suitable means. Preferably, end filler rings or spacers which substantially fill the inter-tube space are inserted and the tubes and rings are welded around the end circumference.

Any suitable composite comprising boron fibers in an aluminum matrix may be formed into tubes by the process of this invention. Typically, the composite preform sheets consist of a plurality of substantially contiguous parallel boron fibers bonded to an aluminum foil. These sheets may be produced by any suitable process. Typically, fibers are adhesively bonded to an aluminum foil, then the fibers are covered with a second foil and the sheets pressure bonded to form a unitary tape or sheet. These single layer tapes are usually diffusion bonded together but may be used simply in the adhesively bonded condition. Alternately, the fibers may be bonded to an aluminum foil by plasma-sprayed aluminum to preform sheets. Any suitable aluminum alloy may be used. Typical alloys include 2024 and 6061 aluminum. Any suitable boron fibers or filaments may be incorporated into the composite. Typical fibers have diameters of from about 0.0040 to 0.008 inch, tensile strength of at least 400,000 psi and tensile modulus of elasticity of at least $55 \times 10^6$ psi. Typical fibers comprise a thin tungsten wire over which the boron has been deposited. A thin silicon carbide coating may be deposited on the boron surface to improve high temperature characteristics. While any suitable arrangement of boron fibers may be used, a parallel closely spaced arrangement is preferred in truss members because the maximum properties are then realized in the direction of the load. The fibers in succeeding layers may be arranged at an angle to each other and to the final tube axis in order to increase transverse tube strength. If desired, other fibers, such as thin tungsten filaments, may be arranged crosswise of the unidirectional boron filaments to improve the transverse strength of the preform sheets. Typically, the boron fibers may be spaced at about 175 fibers per inch of width and the boron fiber content in the sheet may be about 50% by weight.

The isostatic forming and bonding pressure may be applied in any suitable manner. Isostatic pressing requires the application of uniform pressure to all surfaces of the workpiece, such as through a gas or liquid. A high pressure gas autoclave is preferred since an accurate high temperature and pressure environment may be easily maintained.

While any suitable consolidation pressure, temperature and time may be used, for most tubing applications it is preferred that a pressure of from about 3,000 to 10,000 psig and a temperature of from about 800° to 1,000°F be maintained for from about 1 to 3 hours.

The end fitting may be applied to either or both ends of the composite tube and may have any suitable shape. Preferably, the fitting is in the form of a sleeve having a tapered or stepped internal or external surface at the composite tube end. The outer surface of the fitting should just fit within the outer forming tube. After bonding to the composite tube, the fitting may be machined, threaded, etc., or fastened to additional structure, such as by welding. If a fitting having an other than tubular shape is used, the inner and outer forming tubes may be configured to accept it during the bonding operation.

Any suitable titanium or aluminum alloy may be used. Typical titanium alloys include Ti—6Al—4V, Ti—5Al—2.5Sn, Ti—6Al—2Sn—4Zr—2Mo, Ti—3Al—8V—4Mo—4Zr, and Ti—13V—11Cr—3Al. Typical aluminum alloys include types 6061 and 2219.

BRIEF DESCRIPTION OF THE DRAWING

Details of the invention and of several preferred embodiments thereof will be further understood upon reference to the drawing, wherein.

DETAILED DESCRIPTION OF THE INVENTION

Figure 1:
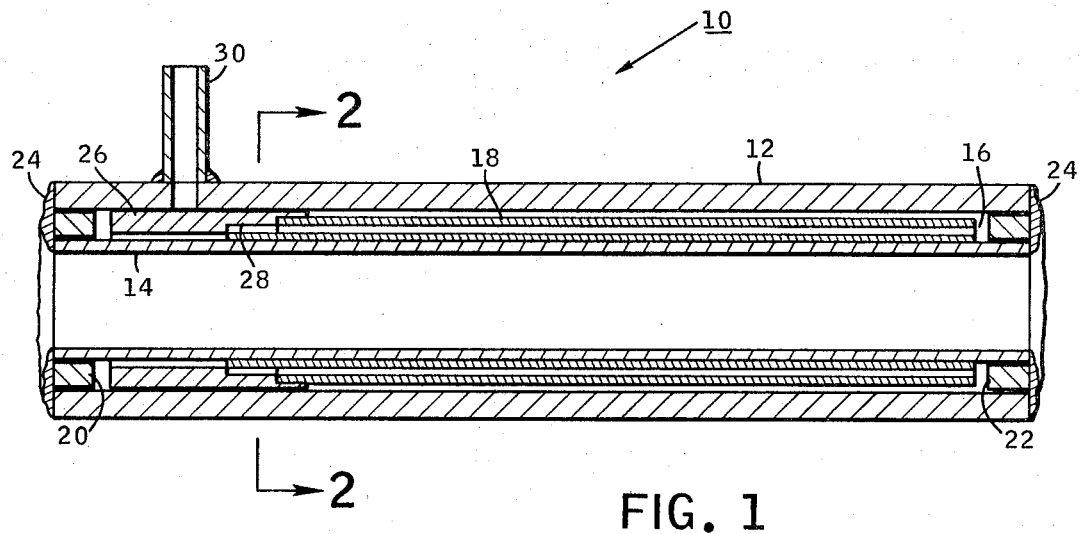
FIG. 1 is a longitudinal section through a tube forming assembly illustrating a first tube-to fitting attachment.

Referring now to FIG. 1, there is seen a longitudinal section taken along the axis of a tubular forming assembly generally designated 10. The assembly 10 includes a heavy-walled outer forming tube 12 and a thinner inner forming tube 14 defining annular space 16 therebetween. Walls 13 and 14 could, alternatively, have equal thickness but different compositions, with tube 14 of a weaker material. A coil 18 of boron/aluminum sheet material is located in space 16. Coil 18 may be formed by wrapping composite sheet material around tube 14 before tube 14 is placed within tube 12, or sheet material may be coiled or wrapped around a suitable mandrel from which it is removed, then is slipped between tubes 12 and 14. Spacers 20 and 22 substantially fill the inter-tube gaps at each end of the assembly. These gaps are then closed and the ends sealed with a weld overlay 24 at each end.

A titanium or aluminum alloy sleeve 26 is positioned in space 16 adjacent to, and overlapping, the end of coil 18. In the embodiment shown, sleeve 26 is stepped at one end 28. Coil 18 conforms to the steps either by being formed from two sheets having different lengths corresponding to the steps, or by being a single sheet cut away at one end so that the sheet when rolled has the stepped appearance. Of course, often fittings will be attached at both ends of the composite tube.

An evacuation tube 30 is secured, as by brazing or welding, over an opening in tube 12. After assembly 10 is assembled and welds 24 are completed, the inter-tube space is evacuated through tube 30, after which tube 30 is sealed, such as by crimping it together. Alternatively, the tube may be connected to a vacuum pump to maintain a continuous vacuum during forming.

Figures 2, 3:
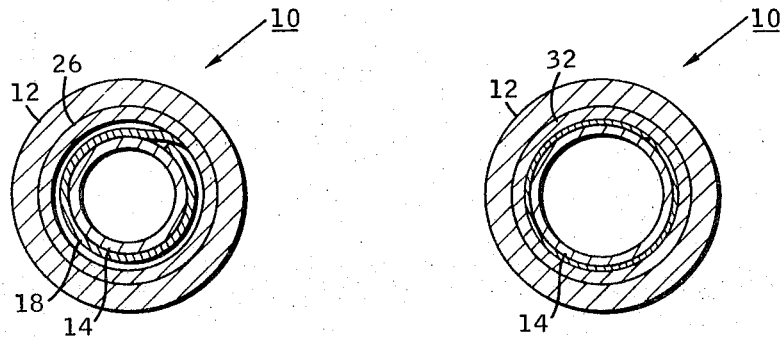
FIG. 2 is a transverse section taken on line 2—2 in FIG. 1, showing the assembly prior to isostatic pressing.
FIG. 3 is a transverse section similar to that shown in FIG. 2, showing the assembly after isostatic pressing.

As seen in FIG. 2, coil 18 of composite material, together with end fitting 26, is loosely fitted in the inter-tube space 16 prior to isostatic pressing. After isostatic pressing, such as in a gas autoclave, inner tube 14 has expanded, pressing the composite material of coil 18 against the inner wall of tube 12, and against the stepped areas of end fitting 26, producing a consolidated composite tube 32. The aluminum tube and titanium fitting develop a high-strength diffusion bond. Forming tubes 12 and 14 are removed, such as by acid etching, leaving a uniform high strength composite tube 32.

Figure 4:
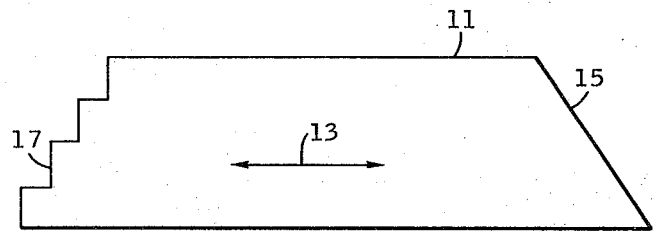
FIG. 4 is a plan view of a composite sheet configuration from which tubes may be formed.

FIG. 4 illustrates typical composite sheet preform configurations. Sheet 11 typically comprises a single layer of parallel contiguous boron fibers, either embedded in an aluminum matrix or bonded together by a synthetic resin and secured to the surface of an aluminum foil. If desired, multiple layers may be bonded together to form a thicker preform. While ordinarily all of the fibers are arranged parallel to arrow 13 (which, as described below, is parallel to the final composite tube axis), if desired some or all of the fibers may be oriented at angles of up to 45° to arrow 13. As seen in FIG. 4, one end 15 of sheet 11 is tapered and the other end 17 is stepped. In actual practice, each end will ordinarily have the same or similar configuration at each end. When sheet 11 is rolled up about an axis parallel to arrow 13, end 15 will give a continuous telescoped spiral appearance while end 17 will provide a stepped end of the sort illustrated in FIG. 1 (but, in this case, with four steps). Alternately, a stepped appearance may be obtained by coiling a number of narrow sheets, each of which has a length corresponding to one step.

FIG. 4 shows an alternative embodiment of the tube-to-fitting attachment. The tube and attachment are shown after isostatic pressing, removal of the forming assembly, and finish machining.

The tube 40 has been isostatically consolidated from two or more layers of boron-aluminum composite material. The inner layer preforms are longer than the outer layer preforms to produce, in this case, two distinct steps 42 and 44. The outer forming tube (not shown) used to form the composite of FIG. 4 was recessed near one end to receive fitting 46, which had a tubular outer surface indicated by broken line 48. The inner surface of fitting 46 is machined to accommodate the composite tube 40. When subjected to isostatic pressing, as discussed above, the boron-aluminum layers are consolidated and firmly bonded to fitting 46. After removal of the forming assembly, such as by acid etching, the outer surface of fitting 46 is machined to form the tapered portion shown at 50 and a selected end fitting 52 is secured to fitting 46, such as by welding or brazing. Any desired structure may be similarly secured to fitting 46.

Figure 5:
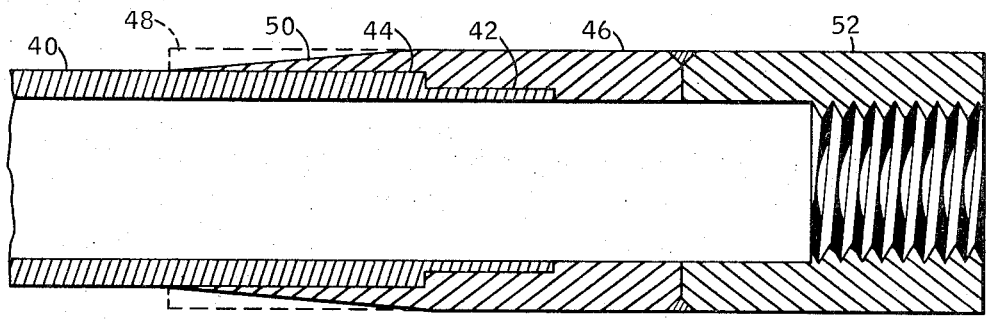
FIG. 5 is a longitudinal section through a portion of a completed tube showing a second embodiment of tube-to-fitting attachment.

A forming assembly for producing another embodiment of the composite structure of this invention is shown in FIG. 5. A titanium or aluminum tube 60 having an inner tapered end is placed between outer and inner forming tubes 62 and 64, respectively, of the sort shown in FIG. 1. One end of a rectangular sheet of boron-aluminum composite material is cut on a bias as shown at end 15 in FIG. 4 so as to have a spiral appearance at that end when the sheet is coiled. The coil 66 is inserted between inner forming tube 64 and outer forming tube 62, with the spiral end in contact with the tapered surface of tube 60. The assembly is closed by spacer ring 58 and weldment 70 and is isostatically pressed as described above. Upon removal of the forming tubes, the coil 66 is found to be uniformly consolidated and uniformly bonded to tube 60.

Figure 7:
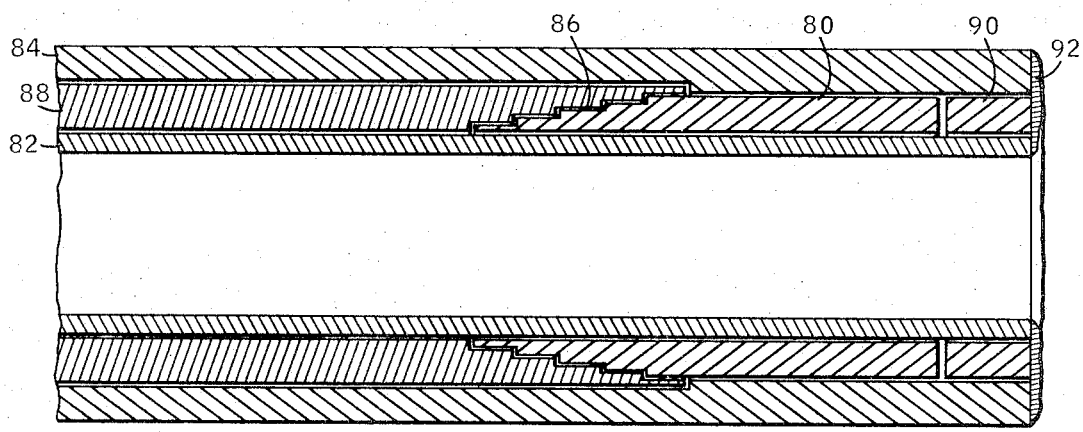
FIG. 7 is a longitudinal section through a portion of the tube forming assembly showing another embodiment of a tube-to-fitting attachment.

Another embodiment of the forming assembly and of the interface between a titanium or aluminum tube and boron-aluminum composite is shown in FIG. 7. In this embodiment, a fitting 80 having a tubular inner surface and a stepped outer surface is inserted between inner forming tube 82 and outer forming tube 84. The steps 86 may either be separate concentric steps or may spiral from the inner to outer end. With concentric steps a coil 88 made up of a plurality of rectangular layers of boron-aluminum sheet material of varying length may be used. With the spiral arrangement, a wide, generally rectangular boron-aluminum composite sheet may be used, with one end cut diagonally so as to correspond to the tube step spacing when coiled up. In either case, coil 88 is inserted between forming tubes 82 and 84, the assembly is sealed by means of spacer rings 90 and weldment 92, and the assembly is isostatically pressed as described above. In this case, as inner tube 82 is forced outwardly, it will press coil 88 together and will press tube 80 outwardly against the coil in contact with the steps to consolidate the boron-aluminum composite material and bond it to fitting 80. The forming assembly may then be removed. If desired, a ring of either or both of the forming tubes may be left in contact with the composite at the stepped region, to further reinforce the bond area.

The overall strength of the tube may be significantly increased by a heat treatment after forming. Preferably, the structure is solution heat treated to a temperature from about 900° to 1050°F, then aged at from about 300° to 400°F for about 6 to 10 hours.

Further details of preferred embodiments of this invention will be apparent from the following examples.

EXAMPLE I

Figure 6:
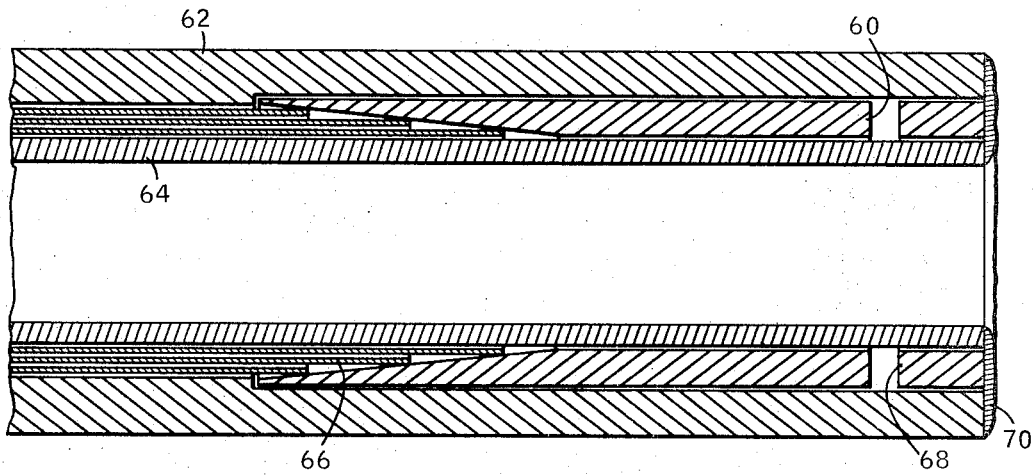
FIG. 6 is a longitudinal section through a forming assembly showing embodiment of tube-to-fitting attachment.

A rectangular sheet of boron/aluminum material, including silicon carbide coated boron filaments, available from the Hamilton-Standard Division of United Aircraft under the "Borsic" trademark, is diagonally trimmed across both ends so that one edge is about 3 inches shorter than the other. The sheet is coiled to produce 6 plies around a 1⅛ inch outside diameter AISI 1015 mild steel seamless tube having a wall thickness of about 0.035 inch. The boron filaments lie parallel to the tube axis, and the trimmed ends produce tapered configurations of the sort shown in FIG. 6. The Borsic tape comprises unidirectionally arranged silicon carbine coated boron fibers having diameters of about 0.004 inch in an aluminum matrix. The tape has a thickness of about 0.0056 inch and a boron fiber content of about 50%. Two Ti—6Al—4V fittings having the shape shown in FIG. 6 are slipped over the ends of the inner forming tube. The wrapped tube is inserted in a 1½ inch inside diameter seamless AISI 1015 mild steel tube having a wall thickness of about 0.065 inch. A thin evacuation tube is connected to an opening in the wall of the outer forming tube. Narrow spacer rings are then inserted at each end of the tubes to substantially fill the inter-tube gap. A weld overlay is applied over the tube ends and spacer rings to seal the tube ends. The system is evacuated and the evacuation tube is sealed by crimping it. The resulting forming and bonding assembly is then placed in a high temperature autoclave. A pressure of about 8,000 psi is applied at a temperature of about 900°F for about 2 hours. The assembly is then removed from the autoclave, cooled to room temperature and placed in a 50% nitric acid bath. The steel tubes are etched away, leaving a consolidated, uniform composite tube having a wall thickness of about 0.040 inch firmly bonded to the titanium fittings. The tube is then solution heat treated at about 975°F, then aged for about 8 hours at about 350°F. The tube is then cooled to room temperature and tested. The tube and fittings are found to accept loads, in tension and compression, in excess of 20,000 pounds without failure.

EXAMPLE II

A 60 by 24 inch rectangular sheet of boron/aluminum composite material, available from the Amercom Corporation, consisting of collimated boron fibers between 6061 aluminum foils is prepared with the fibers oriented parallel to the long side. A 1-inch strip is trimmed from each narrow end, half way across, to provide a single step. The sheet is wrapped around an inner forming tube of fully annealed AISI 1015 seamless tubing having a 0.875 inch outer diameter and a 0.066 inch wall thickness. The coil has the configuration illustrated in FIG. 5. Two 6061 aluminum alloy tubular fittings having a step corresponding to the coil are slipped over the end of the inner forming tube and into contact with the coil end. The fitting has an inside diameter of about 0.880 inch and an outer diameter of about 1.10 inch. The inner forming assembly is then slipped into an outer forming tube of asdrawn seamless AISI 1015 tubing having an inner diameter adjacent to the coil of about 1 inch with recesses to accommodate the fittings having a diameter of about 1.125 inch and an outer diameter of about 1.25 inch. An evacuation tube is connected to an opening in the outer forming tube, spacer rings are inserted into the inter-tube gap at each end and weld over-lays are applied. The inter-tube space is evacuated and the evacuation tube is sealed. The forming assembly is placed in a high pressure autoclave and is maintained at about 9,000 psi and 800°F for about 3 hours. The assembly is then removed and cooled to room temperature. The outer surface is rough turned on a lathe until the wall thickness of the outer tube over the composite tube and the fitting is substantially equal to the 0.066 inch wall thickness of the inner tube. The assembly is then placed in a 50% nitric acid bath at a temperature of about 150°F. The forming tubes are etched away in about 30 minutes. The aluminum fitting is then turned down where it overlaps the tube to form a smooth taper, as illustrated in FIG. 5. The tube is found to be fully consolidated and to be well bonded to the aluminum fitting.

EXAMPLE III

The process of Example II is repeated, except that two tube and end fitting assemblies are prepared, each using Ti—5Al—2.5Sn titanium alloy end fittings. Both assemblies are found to be well bonded and consolidated. The second tube and fitting combination is given a post-forming heat treatment consisting of a solution heat treatment at about 1,000°F, then ageing at about 400°F for about 6 hours. The tensile and compression strength characteristics are found to be significantly improved by the heat treatment.

While specific conditions, proportions and arrangements have been described in the above description of preferred embodiments, these may be varied within the scope of this disclosure, depending on desired conditions, product use, etc., with similar results. For example, the inner and outer forming tubes may be of different compositions, other methods may be used for removing the forming tubes, titanium fittings of other shapes may be used, etc., as discussed above.

Other modifications, applications and ramifications of the invention will become apparent to those skilled in the art upon reading this disclosure. These are intended to be included within the scope of this invention, as defined in the appended claims.

I claim:
1. A method of fabricating a composite structure which comprises the steps of:
    providing at least one composite sheet comprising boron fibers in an aluminum matrix;
    forming a coil of said sheet around a first shaping tube in a manner providing a stepped, telescoping appearance to at least a first end of said coil;
    placing a fitting over said first tube into contact with said first end of said coil, said fitting being shaped to conform to said stepped, telescoping, configuration; said fitting comprising an alloy selected from the group consisting of titanium and aluminum alloys;
    inserting the assembled first forming tube into a second shaping tube;
    sealing the assembly of tubes and substantially evacuating gases from therebetween;
    subjecting said assembly to a diffusion bonding temperature at an isostatic pressure sufficient to consolidate said coil for a period sufficient to diffusion bond said coil together and to said fitting; and
    removing said shaping tubes.
2. The method according to claim 1 wherein said at least one sheet has a generally rectangular shape with a unidirectional fiber orientation and at least one end is cut diagonally transverse to the fiber direction whereby a smooth, helical telescoping appearance is created when said sheet is coiled about said tube.
3. The method according to claim 1 wherein said at least one sheet has generally rectangular shape and at least one end is trimmed along lines parallel to that end to provide a plurality of steps, whereby a plurality of discrete steps is created when said sheet is coiled about said tube.

4. The method according to claim 1 wherein said at least one sheet comprises a plurality of generally rectangular sheets of different lengths in the fiber direction, whereby a plurality of discrete steps is created when said sheets are coiled about said tube in order of length.

5. The method according to claim 1 wherein said second tube has at least about 1.5 times the wall strength of said first tube whereby said first tube expands during said isostatic pressing.

6. The method according to claim 1 wherein said assembly is subjected to a temperature of from about 800° to 1000° F and an isostatic pressure of from about 3,000 to 10,000 psi for from about 1 to 3 hours.

7. The method according to claim 1 wherein said first and second shaping tubes are removed by treating the assembly with a reagent which dissolves the composition of said first and second tubes without significantly affecting the composition of said composite sheets or said fitting.

* * * * *